(12) United States Patent
Jung et al.

(10) Patent No.: US 12,117,242 B2
(45) Date of Patent: Oct. 15, 2024

(54) FURNACE FOR PRODUCING SECONDARY BATTERY CATHODE MATERIAL AND METHOD FOR FIRING SECONDARY BATTERY CATHODE MATERIAL

(71) Applicants: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

(72) Inventors: Keeyoung Jung, Pohang-si (KR); Choongmo Yang, Seoul (KR); Yoon Cheol Park, Pohang-si (KR); Soon Cheol Hwang, Pohang-si (KR); Yeong Woo Kim, Pohang-si (KR); Young Min Park, Pohang-si (KR)

(73) Assignees: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

( * ) Notice: Subject to any disclaimer, the term of this patent is extended or adjusted under 35 U.S.C. 154(b) by 551 days.

(21) Appl. No.: 17/415,851

(22) PCT Filed: Dec. 19, 2019

(86) PCT No.: PCT/KR2019/018097
§ 371 (c)(1),
(2) Date: Jun. 18, 2021

(87) PCT Pub. No.: WO2020/130669
PCT Pub. Date: Jun. 25, 2020

(65) Prior Publication Data
US 2022/0065534 A1    Mar. 3, 2022

(30) Foreign Application Priority Data
Dec. 19, 2018 (KR) .................. 10-2018-0165659

(51) Int. Cl.
*F27B 9/24* (2006.01)
*F27B 9/04* (2006.01)
(Continued)

(52) U.S. Cl.
CPC ............ *F27B 9/3077* (2013.01); *F27B 9/045* (2013.01); *F27D 7/02* (2013.01); *F27D 17/002* (2013.01);
(Continued)

(58) Field of Classification Search
CPC .. F27B 9/02; F27B 9/028; F27B 9/029; F27B 9/20; F27B 9/24; F27B 9/2407; F27B 13/02
See application file for complete search history.

(56) References Cited

U.S. PATENT DOCUMENTS

| | | | |
|---|---|---|---|
| 8,199,193 B2 * | 6/2012 | Kolek | F27B 9/36 348/83 |
| 2010/0110175 A1 | 5/2010 | Kolek et al. | |
| 2010/0127418 A1 | 5/2010 | Davidson et al. | |

FOREIGN PATENT DOCUMENTS

| | | | |
|---|---|---|---|
| CN | 1346960 A | | 5/2002 |
| CN | 108692567 A | * | 10/2018 |

(Continued)

OTHER PUBLICATIONS

International Search Report and Written Opinion issued in corresponding International Application No. PCT/KR2019/018097 mailed Mar. 27, 2020, with English translation.
(Continued)

*Primary Examiner* — Gregory A Wilson
(74) *Attorney, Agent, or Firm* — Morgan, Lewis & Bockius LLP

(57) ABSTRACT

A furnace for producing a secondary battery cathode material according to an exemplary embodiment of the present invention includes; a chamber of which the internal space is heated by a heater, a conveyer installed in the chamber and conveying a sagger containing raw material power of a
(Continued)

cathode material of a secondary battery in one direction; and a gas supply nozzle and an exhaust port installed in the chamber.

The chamber is divided into a front chamber, an intermediate chamber, and a rear chamber. The intermediate chamber has an inlet shutter and an outlet shutter for sealing the internal space thereof, and an exhaust port of the intermediate chamber is connected to an exhaust device for discharging gas.

8 Claims, 6 Drawing Sheets

(51) Int. Cl.
    *F27B 9/30*     (2006.01)
    *F27D 7/02*     (2006.01)
    *F27D 17/00*     (2006.01)
    *H01M 4/505*     (2010.01)
    *H01M 4/525*     (2010.01)
    *H01M 10/0525*     (2010.01)
    *H01M 4/02*     (2006.01)

(52) U.S. Cl.
    CPC ........... H01M 4/505 (2013.01); H01M 4/525 (2013.01); H01M 10/0525 (2013.01); *F27D 2007/026* (2013.01); *H01M 2004/028* (2013.01)

(56) References Cited

FOREIGN PATENT DOCUMENTS

| | | | | |
|---|---|---|---|---|
| CN | 111372674 A | * | 7/2020 | ............. B01J 4/002 |
| EP | 1475446 A1 | | 11/2004 | |
| GB | 2156640 A | | 10/1985 | |
| JP | 2003-240440 A | | 8/2003 | |
| JP | 2009-103331 A | | 5/2009 | |
| JP | 2010-014290 A | | 1/2010 | |
| JP | 5049093 B2 | * | 10/2012 | |
| JP | 5276796 B2 | * | 8/2013 | |
| JP | 2013-253758 A | | 12/2013 | |
| JP | 2016-153704 A | | 8/2016 | |
| JP | 2017-017042 A | | 1/2017 | |
| JP | 2018-125438 A | | 8/2018 | |
| KR | 10-2008-0090058 A | | 10/2008 | |
| KR | 10-2010-0003701 A | | 1/2010 | |
| KR | 10-1177545 B1 | | 8/2012 | |
| KR | 10-2014-0088352 A | | 7/2014 | |
| KR | 10-1427537 B1 | | 8/2014 | |
| KR | 10-2018-0073308 A | | 7/2018 | |
| KR | 10-2018-0074127 A | | 7/2018 | |
| KR | 10-2018-0074252 A | | 7/2018 | |
| KR | 10-2018-0119336 A | | 11/2018 | |
| KR | 10-2019-0036791 A | | 4/2019 | |
| KR | 10-1987940 B1 | | 6/2019 | |
| KR | 10-2019-0076746 A | | 7/2019 | |
| KR | 10-2019-0076767 A | | 7/2019 | |
| KR | 10-2020-0076514 A | | 6/2020 | |
| WO | 2000-017954 A1 | | 3/2000 | |
| WO | 2019-066545 A1 | | 4/2019 | |

OTHER PUBLICATIONS

Extended European Search Report dated Jan. 14, 2022 issued in European Patent Application No. 19898834.7.
Chinese Office Action dated Dec. 8, 2023 issued in Chinese Patent Application No. 201980085156.5 (with English translation).

* cited by examiner

FURNACE FOR PRODUCING SECONDARY BATTERY CATHODE MATERIAL AND METHOD FOR FIRING SECONDARY BATTERY CATHODE MATERIAL

CROSS REFERENCE

This application is the U.S. National Phase under 35 U.S.C. § 371 of International Application No. PCT/KR2019/018097 filed on Dec. 19, 2019, which claims the benefit of Korean Application No. 10-2018-0165659 filed on Dec. 19, 2018, the entire contents of each are hereby incorporated by reference.

TECHNICAL FIELD

The present invention relates to a furnace for producing a cathode material (cathode active material) of a secondary battery, and a method for firing a secondary battery cathode material using the furnace.

BACKGROUND ART

A lithium secondary battery that uses lithium of secondary batteries has the advantage of high energy density, an excellent output characteristic, and ease of lightweighting. $LiCoO_2$ is generally used as the cathode material of a lithium secondary battery, and recently, an NCM-based cathode material containing nickel, cobalt, and manganese has been studied to replace cobalt, which is expensive, and increase the capacity per weight.

A manufacturing process of a cathode material includes a process of firing a sagger having raw material powder therein at temperature of about 400° C. to 1,100° C., depending on the characteristics of the raw material, in a furnace. The furnace may be a Roller Hearth Kiln (RHK) that is a straight-type furnace and the firing process of a cathode material may be composed of a supplying and preheating period, a temperature-increasing period, a temperature-maintaining period, a cooling period, and a room temperature-cooling and discharging period.

In the firing process of a cathode material, a large amount of $CO_2$ and $H_2O$ (steam) is produced, particularly, at the early stage of the temperature-increasing period and the temperature-maintaining period, and the produced gas generally influences the reaction time, reaction rate, etc. of the cathode material. Furnaces of the related art are operated while appropriately adjusting air supply using bottom air supply, top air supply, and side air supply, and exhaust using top exhaust.

However, $H_2O$ of the produced gas is relatively easy to remove, but $CO_2$ is difficult to discharge due to larger molecular weight than that of dry air or oxygen that is used as supply gas. In particular, when the partial pressure of $CO_2$ is high after the early stage of the temperature-maintaining period, a chemical reaction may not progress, so there is a need for a method of efficiently removing $CO_2$.

When amount of a cathode material that is put into an RHK furnace is increased, reaction gas is produced from cathode powder and lithium source-mixed powder. When the reaction gas remains without being discharged, the reaction rate of the cathode material decreases. Accordingly, there is a need for a plan for quickly and efficiently removing $CO_2$ and reaction gas.

DISCLOSURE

Technical Problem

The present invention has been made in an effort to provide a furnace for producing a secondary battery cathode material, and a method for firing a secondary battery cathode material using the furnace having advantages of being able to increase the reaction rate of a cathode material and reduce firing time by efficiently removing $CO_2$ and reaction gas that are produced in the process of firing a cathode material of a secondary battery.

Technical Solution

A furnace for producing a secondary battery cathode material according to an exemplary embodiment of the present invention includes; a chamber of which the internal space is heated by a heater; a conveyer installed in the chamber and conveying a sagger containing raw material power of a cathode material of a secondary battery in one direction; and a gas supply nozzle and an exhaust port installed in the chamber. The chamber includes a front chamber including a temperature-increasing section, a rear chamber including a temperature-maintaining section, and an intermediate chamber positioned between the front chamber and the rear chamber and separating the front chamber and the rear chamber. The intermediate chamber has an inlet shutter and an outlet shutter for sealing the internal space thereof, and an exhaust port of the intermediate chamber is connected to an exhaust device for discharging gas.

The intermediate chamber may maintain the same temperature as the temperature-maintaining section. The front chamber may further include a front portion of the temperature-maintaining section, and the rear chamber may include the other portion of the temperature-maintaining section.

The intermediate chamber may be supplied with the cathode material from the front chamber with the outlet shutter closed and the inlet shutter open, and the internal space may be sealed, as the inlet shutter is closed. The exhaust device may be any one of a vacuum pump, an aspirator, and a blower, and may discharge gas from the sealed intermediate chamber.

The intermediate chamber may include a gas supply nozzle, and the gas supply nozzle may supply dry air or oxygen into the intermediate chamber after the gas in the intermediate chamber is discharged. After the internal space of the intermediate chamber is filled with the dry air or oxygen, the outlet shutter may be opened and the cathode material may be conveyed into the rear chamber. The intermediate chamber may have an internal volume smaller than those of the front chamber and the rear chamber.

A method of producing a secondary battery cathode material according to another exemplary embodiment of the present invention includes: a temperature-increasing step in which the cathode material is put in the sagger and supplied into the front chamber, and then passes through a preheating and temperature-increasing section in the front chamber; a conveying step in which the cathode material in the front chamber is conveyed into the intermediate chamber with the outlet shutter closed and the inlet shutter open; an exhaust step in which the intermediate chamber is closed by closing the inlet shutter and the exhaust device operates and discharge gas from the intermediate chamber; and a firing step in which the outlet shutter is opened, and the cathode material in the intermediate chamber is conveyed into the rear chamber and then fired through the temperature-maintaining section in the rear chamber.

The exhaust device may be any one of a vacuum pump, an aspirator, and a blower in the exhaust step, and dry air or oxygen may be supplied into the intermediate chamber through a gas supply nozzle of the intermediate chamber immediately after the exhaust step. The inlet shutter and the outlet shutter are controlled not to be simultaneously opened, whereby gas in the front chamber may be prevented from diffusing into the rear chamber.

Advantageous Effects

According to an exemplary embodiment of the present invention, the gas, particularly, CO2 produced in the temperature-increasing section A20 is not transmitted to the rear chamber 1312 because it is discharged at the intermediate chamber 13, and the rear chamber 13 has a very low partial pressure of $CO_2$. Accordingly, the reaction rate of the cathode material is increased and the remaining lithium is decreased in the rear chamber 13 including the temperature-maintaining section A30, whereby the manufacturing quality of the cathode material can be increased. Further, the entire firing time is reduced, whereby productivity of the cathode material can be increased.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
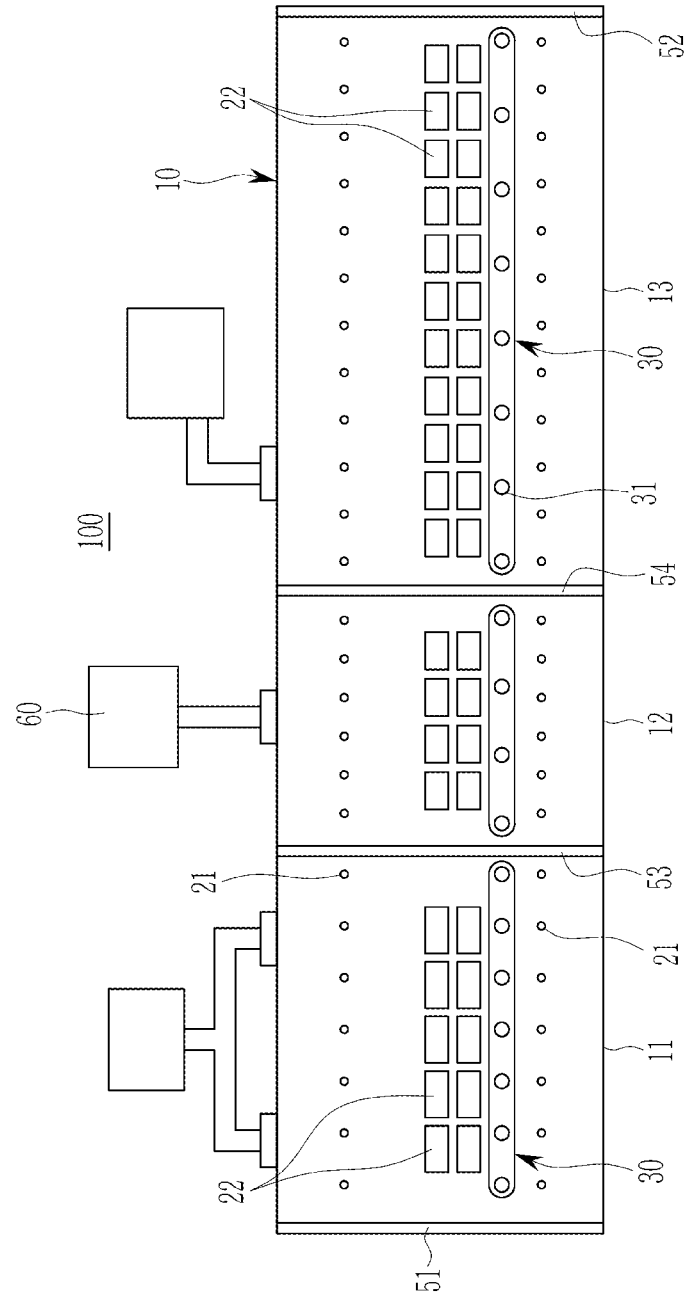
FIG. 1 is a diagram showing the configuration of a furnace for producing a secondary battery cathode material according to an exemplary embodiment of the present invention.
Figure 2:
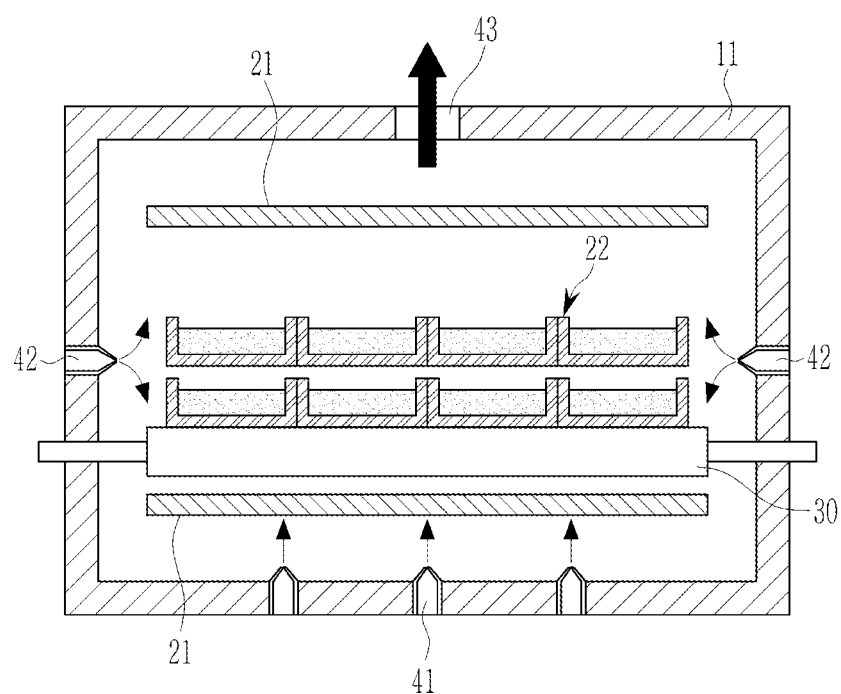
FIG. 2 is a cross-sectional view of a front chamber of the furnace shown in FIG. 1.
Figure 3:
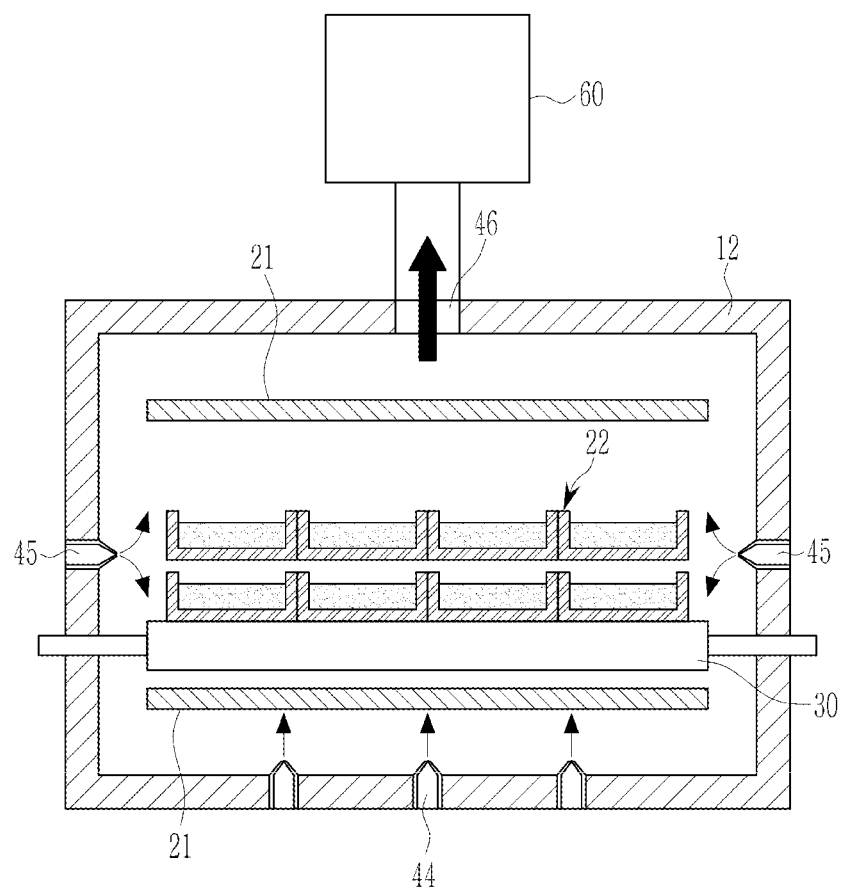
FIG. 3 is a cross-sectional view of an intermediate chamber of the furnace shown in FIG. 1.
Figure 4:
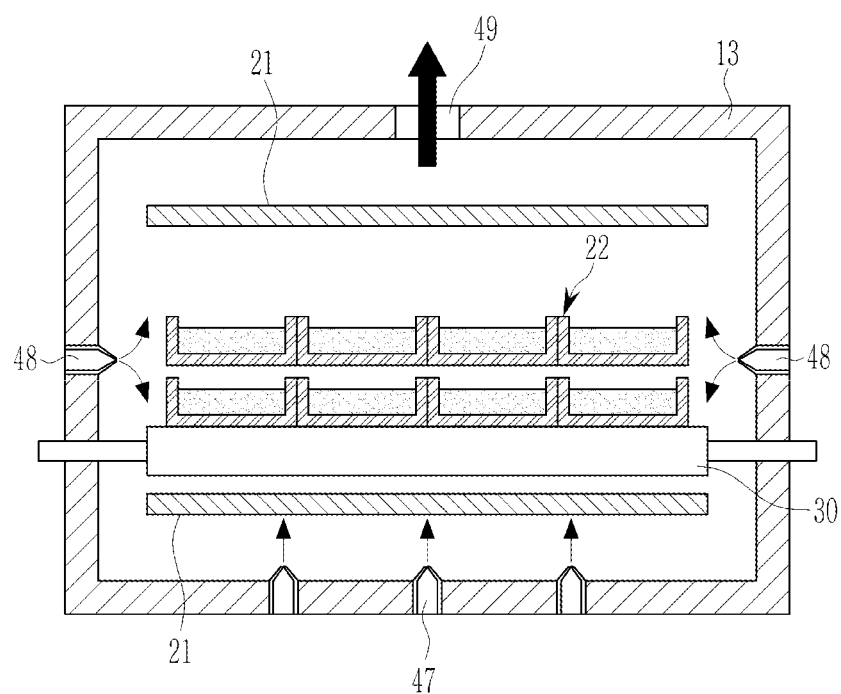
FIG. 4 is a cross-sectional view of a rear chamber of the furnace shown in FIG. 1.

FIG. 1 is a diagram showing the configuration of a furnace for manufacturing a cathode material of a secondary battery (hereinafter, referred to as a 'furnace') according to an exemplary embodiment of the present invention. FIGS. 2, 3, and 4 are cross-sectional views of a front chamber, an intermediate chamber, and a rear chamber of the furnace shown in FIG. 1, respectively.

Referring to FIGS. 1 to 4, a furnace 100 includes a chamber 10 of which the inside is heated by a heater 21, a conveyer 30 installed in the chamber 10 and conveying saggers 22 containing raw material powder for the cathode of a secondary battery in one direction, and an gas supply/exhaust device including an gas supply nozzle and an exhaust port install in the chamber 10.

The chamber 10 is a straight chamber that is long in one direction and the furnace 100 may be a Roller Hearth Kiln (RHK). The conveyer 30 may include a plurality of rollers 31 that is rotated by a motor, but is not limited to the roller type and may have any mechanical configuration as long as it can convey saggers 22 in one direction.

The chamber 10 is divided into a front chamber 11, an intermediate chamber 12, and a rear chamber 13. The intermediate chamber 12 is positioned between the front chamber 11 and the rear chamber 13, thereby spatially separate the front chamber 11 and the rear chamber 13. In other words, the intermediate chamber 12 may be positioned to be in direct contact with the front chamber 11 and the rear chamber 13.

The front chamber 11 has a first shutter 51 that is an inlet shutter and the rear chamber 13 has a second shutter 52 that is an outlet shutter. The intermediate chamber 12 has a third shutter 53 that is an inlet shutter and a fourth shutter 54 that is an outlet shutter. The third shutter 53 is positioned between the front chamber 11 and the intermediate chamber 12 and the fourth shutter 54 is positioned between the intermediate chamber 12 and the rear chamber 13.

The conveyer 30 is installed throughout the front chamber 11, the intermediate chamber 12, and the rear chamber 13 and continuously conveys saggers 22. The gas supply/exhaust device includes an gas supply nozzle and an exhaust port installed in each of the front chamber 11, the intermediate chamber 12, and the rear chamber 13.

Referring to FIG. 1, in the front chamber 11, the gas supply/exhaust device may include at least one first gas supply nozzle 41 installed in the bottom of the front chamber 11, at least one second gas supply nozzle 42 installed in a side wall of the front chamber 11, and at least one first exhaust port 43 installed in the top of the front chamber 11.

The first and second gas supply nozzles 41 and 42 supply dry air or oxygen into the front chamber 11. The first exhaust port 43 is connected to a common exhaust device such as a blower. The position of the first exhaust port 43 of the front chamber 11 shown in FIGS. 1 and 2 is an example and is not limited thereto.

Referring to FIG. 3, in the intermediate chamber 12, the gas supply/exhaust device includes at least one second exhaust port 46 installed in the top of the intermediate chamber 12, and the at least one second exhaust port 46 is connected to an exhaust device 60. The exhaust device 60 may be any one of a vacuum pump, an aspirator, and a blower, and discharges gas from the intermediate chamber 12.

The gas supply/exhaust device may include at least one third gas supply nozzle 44 installed in the bottom of the intermediate chamber 12 and at least one fourth gas supply nozzle 45 installed in a side wall of the intermediate chamber 12. The third and fourth gas supply nozzle 44 and 45 can supply dry air or oxygen into the intermediate chamber 12 that has been exhausted. One of the third gas supply nozzle 44 and the fourth gas supply nozzle 45 can be omitted.

Referring to FIG. 4, in the rear chamber 13, the gas supply/exhaust device may include at least one fifth gas supply nozzle 47 installed in the bottom of the rear chamber 13, at least one sixth gas supply nozzle 48 installed in a side wall of the rear chamber 13, and at least one third exhaust port 49 installed in the top of the rear chamber 13.

The fifth and sixth gas supply nozzles 47 and 48 supply dry air or oxygen into the rear chamber 13. The third exhaust port 49 is connected to a common exhaust device such as a blower. The position of the third exhaust port 49 of the rear chamber 13 shown in FIGS. 1 and 4 is an example and is not limited thereto.

Figure 5:
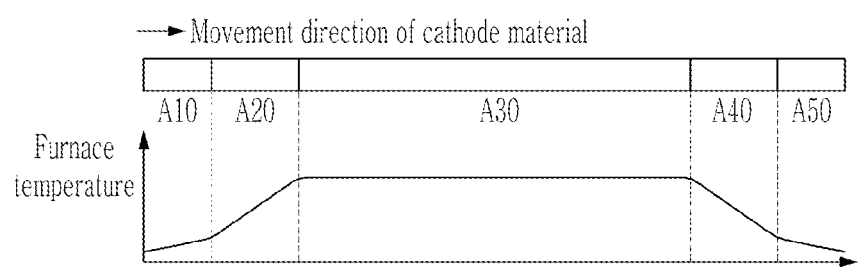
FIG. 5 is a diagram showing a temperature profile for each section of the furnace shown in FIG. 1.

FIG. 5 is a diagram showing a temperature profile for each section of the furnace shown in FIG. 1.

Referring to FIG. 5, the furnace is divided into a supplying and preheating section A10, a temperature-increasing section A20, a temperature-maintaining section A30, a cooling section A40, and a room temperature-cooling and discharging section A50. The temperature of the heat that is generated by the heater 21 is controlled in each of the sections, thereby implementing set temperatures in the movement direction of a cathode material.

The temperature of the furnace is gradually increased in the supplying and preheating section A10 and the temperature-increasing section A20, is maintained at a firing temperature in the temperature-maintaining section A30, and is gradually decreased in the cooling section A40 and the room temperature-cooling and discharging section A50. The firing reaction rate of a cathode material gradually increases in the temperature-increasing section A20 and shows the maximum value in the temperature-maintaining section A30.

The temperature-increasing section A20 corresponds to the early stage of a firing reaction and the temperature-maintaining section A30 corresponds to the middle/last sage of the firing reaction.

Meanwhile, a large amount of $CO_2$ and $H_2O$ (steam) is produced in the temperature-increasing section A20 and at the early stage of the temperature-maintaining section A30. Further, when a amount of a cathode material that is supplied into the sagger 22 is increased, a large amount of reaction gas is also produced from cathode powder and lithium source-mixed powder. A reaction progresses at the early stage of a firing reaction of a cathode material even if the partial pressure of the reaction gas is high, but a reaction does not progress at the middle/last stage of the firing reaction when the partial pressure of the reaction gas is high.

In particular, when the partial pressure of $CO_2$ is high at the middle/last stage of a firing reaction, a firing reaction of a cathode material does not occur, so the reaction rate drops suddenly.

Referring to FIGS. 1 to 5, the front chamber 11 may include the supplying and preheating section A10 and the temperature-increasing section A20, and the rear chamber 13 may include the temperature-maintaining section A30, the cooling section A40, and the room temperature-cooling and discharging section A50.

Alternatively, the front chamber 11 may include supplying and preheating section A10, the temperature-increasing section A20, and a front portion of the temperature-maintaining section A30, and the rear chamber 13 may include the other portion of the temperature-maintaining section A30, the cooling section A40, and the room temperature-cooling and discharging section A50. In both cases, the intermediate chamber 12 maintains the same temperature as the temperature-maintaining section A30.

The intermediate chamber 12 is spatially separated from the rear chamber 13 with the fourth shutter 54 closed, and in this state, is supplied with a cathode material, which has discharged a large amount of gas, from the front chamber 11 through the third chamber 53 that is open. Thereafter, the third shutter 53 is closed, whereby the intermediate chamber 12 and the front chamber 11 are spatially separated, and gas ($CO_2$, steam, and reaction gas) are discharged from the intermediate chamber 12 through the second exhaust port 46 by operation of the exhaust device 60.

A gas flow emitted out of the sagger 22 and gas flow kept in the sagger 22 both exist around the sagger 22 that has undergone the temperature-increasing process in the front chamber 11. The gas flow emitted out of the sagger 22 is easy to discharge, but the gas flow kept in the sagger 22 is difficult to discharge. In particular, the more the saggers 22 are stacked, the more the gas flow kept in the saggers 22 is difficult to discharge.

A sufficient exhaust time should be secured to discharge all of both gas flows described above in a furnace composed of a single chamber in the related art. However, in this case, the entire firing time increases, so productivity is deteriorated.

In the present exemplary embodiment, the front chamber 11 in which a large amount of gas is produced is spatially separated from the rear chamber 13 in which the partial pressure of $CO_2$ has great influence on a reaction, and a cathode material that has produced a large amount of gas is discharged from the intermediate chamber 12, thereby preventing the gas in the front chamber from transferring into the rear chamber 13.

In this case, the intermediate chamber 12 has an internal volume smaller than those the front chamber 11 and the rear chamber 13. Accordingly, smooth exhaust can be achieved within a short time and it is possible to effectively discharge not only the gas flow emitted out of the sagger 22, but the gas flow kept in the sagger 22.

While the gas is discharged or after the gas is completely discharged, dry air or oxygen can be supplied into the intermediate chamber 12 through the third gas supply nozzle 44 and the fourth gas supply nozzle 45. After the inside of the intermediate chamber 12 changes into a new gat atmosphere, the fourth shutter 54 is opened and the cathode material in the intermediate chamber 12 is conveyed into the rear chamber 13.

In this process, the third shutter 53 and the fourth shutter 54 may be controlled not to be simultaneously opened, and $CO_2$ in the front chamber 11 is blocked by the intermediate chamber 12, so it does not diffuse into the rear chamber 13.

According to the furnace 100 of the present exemplary embodiment, the partial pressure of $CO_2$ of the rear chamber 13 can be effectively reduced by existence of the intermediate chamber 12 spatially separating the front chamber 11 and the rear chamber 13 and the operation of the exhaust device 60. As a result, the reaction rate of the cathode material increases and remaining lithium decreases, so the manufacturing quality of the cathode material can be increased. Further, the number of saggers to be stacked is increased and the entire firing time is decreased, so productivity can be increased.

Figure 6:
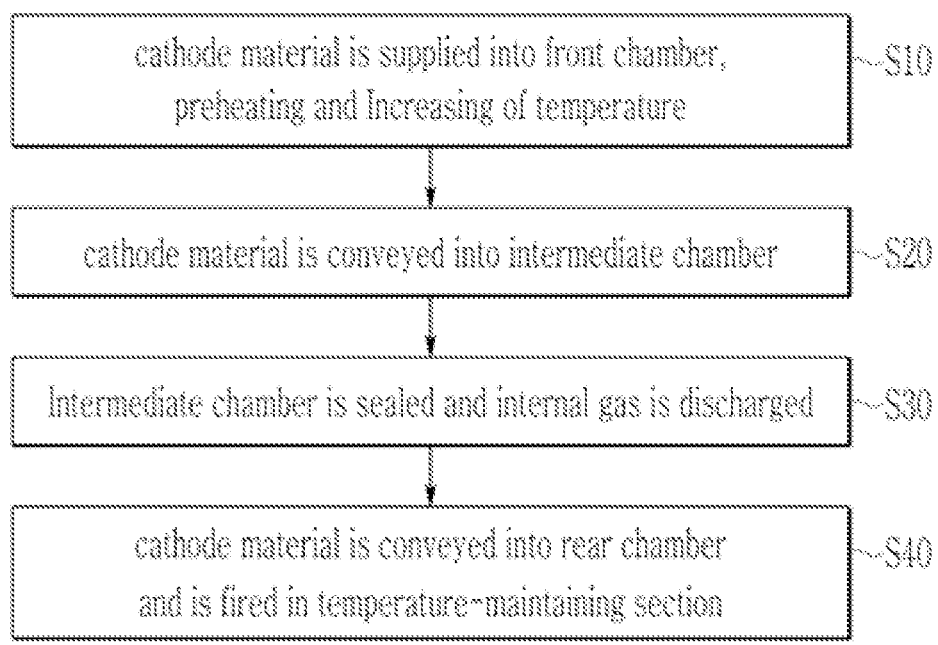
FIG. 6 is a flowchart showing a method for firing a secondary battery cathode material according to an exemplary embodiment of the present invention.

FIG. 6 is a flowchart showing a firting method of a cathode material of a secondary battery according to an exemplary embodiment of the present invention.

Referring to FIG. 6, a method of firing a second battery cathode material includes a first step S10 in which a cathode material put in a sagger is supplied into the front chamber and passes through the preheating and temperature-increasing sections, a second step S20 in which the cathode material in the front chamber is conveyed into the intermediate chamber, a third step S30 in which the intermediate chamber is sealed and gas in the intermediate chamber is discharged, and a fourth step in which the cathode material in the intermediate chamber is conveyed into the rear chamber and is fired in the temperature-maintaining section.

Referring to FIGS. 1 to 6, the cathode material is put into a sagger 22 in a powder type and then supplied into the front chamber 11 in the first step S10. The front chamber 11 may include the supplying and preheating section A10 and the temperature-increasing section A20, and may further include the front portion of the temperature-maintaining section A30.

The cathode material discharges a large amount of gas ($CO_2$, steam, and reaction gas) in the temperature-increasing section A20, or in the temperature-increasing section A20 and the front portion of the temperature-maintaining section A30. In particular, since $CO_2$ suppresses a firing reaction in the temperature-maintaining section A30, it is required to prevent $CO_2$ from diffusing into the rear chamber 13.

In the second step S20, the intermediate chamber 12 maintains the same temperature as the temperature-maintaining section A30 and is supplied with the cathode material that has passed through the temperature-increasing section A20 through the third shutter 53 (inlet shutter) that is open with the fourth shutter 54 (outlet shutter) closed.

In the third step S30, the third shutter 53 of the intermediate chamber is closed and the gas in the intermediate chamber 12 is discharged by operation of the exhaust device 60. The exhaust device 60 may be any one of a vacuum pump, an aspirator, and a blower that is connected to the second exhaust port 46 of the intermediate chamber 12.

The intermediate chamber 12 has an internal volume smaller than those of the front chamber 11 and the rear chamber 13 and is smoothly exhausted within a short time. The intermediate chamber 12 effectively discharge both of the gas flow emitted from the sagger 22 and the gas flow kept in the sagger 22.

After the gas in the intermediate chamber 12 is discharged, dry air or oxygen can be supplied into the intermediate chamber 12 through the third gas supply nozzle 44 and the fourth gas supply nozzle 45 of the intermediate chamber 12. Accordingly, the inside of the intermediate chamber 12 changes 5 into a new gas atmosphere.

In the fourth step S40, the fourth shutter 54 of the intermediate chamber 12 is opened and the cathode material in the intermediate chamber 12 is conveyed into the rear chamber 13. The cathode material is fired through the temperature-maintaining section A30 in the rear chamber 13 and is discharged through the cooling section A40 and the room temperature-cooling and discharging section A50.

The gas, particularly, $CO_2$ produced in the temperature-increasing section A20 is not transmitted to the rear chamber 13 because it is discharged at the intermediate chamber 12, and the rear chamber 13 has a very low partial pressure of $CO_2$. Accordingly, the reaction rate of the cathode material is increased and the remaining lithium is decreased in the rear chamber 13 including the temperature-maintaining section A30, whereby the manufacturing quality of the cathode material can be increased.

Although preferred exemplary embodiments of the present invention were described above, the present invention is not limited thereto and may be modified in various ways within the range of the claims, the detailed description, and the accompanying drawings, and these are also included in the range of the present invention.

(Reference Numerals)

100: furnace
10: chamber
11: front chamber
12: intermediate chamber
13: rear chamber
21: heater (Reference Numerals)

22: sagger
30: conveyer
51: first shutter
52: second shutter
53: third shutter
54: fourth shutter
60: exhaust device

The invention claimed is:

1. A furnace for producing a secondary battery cathode material, the furnace comprising:
a chamber of which the internal space is heated by a heater;
a conveyer installed in the chamber and conveying a sagger containing raw material power of a cathode material of a secondary battery in one direction; and
a gas supply nozzle and an exhaust port installed in the chamber,
wherein the chamber includes
a front chamber including a temperature-increasing section, a rear chamber including a temperature-maintaining section, and an intermediate chamber positioned between the front chamber and the rear chamber and separating the front chamber and the rear chamber, and
the intermediate chamber has an inlet shutter and an outlet shutter for sealing the internal space thereof, and the exhaust port of the intermediate chamber is connected to an exhaust device for discharging gas, and
wherein the intermediate chamber includes a gas supply nozzle, and the gas supply nozzle supplies dry air or oxygen into the intermediate chamber after the gas in the intermediate chamber is discharged,
wherein the inlet shutter and the outlet shutter are controlled not to be simultaneously opened, whereby gas in the front chamber is prevented from diffusing into the rear chamber.

2. The furnace of claim 1, wherein:
the intermediate chamber maintains the same temperature as the temperature-maintaining section.

3. The furnace of claim 2, wherein:
the intermediate chamber is supplied with the cathode material from the front chamber with the outlet shutter closed and the inlet shutter open, and the internal space is sealed, as the inlet shutter is closed.

4. The furnace of claim 3, wherein:
the exhaust device is any one of a vacuum pump, an aspirator, and a blower, and discharges gas from the sealed intermediate chamber.

5. The furnace of claim 1, wherein:
after the internal space of the intermediate chamber is filled with the dry air or oxygen, the outlet shutter is opened and the cathode material is conveyed into the rear chamber.

6. The furnace claim 1, wherein:
the intermediate chamber has an internal volume smaller than those of the front chamber and the rear chamber.

7. A method of producing a secondary battery cathode material using the furnace of claim 1, the method comprising:
a temperature-increasing step in which the cathode material is put in the sagger and supplied into the front chamber, and then passes through a preheating and temperature-increasing section in the front chamber;

a conveying step in which the cathode material in the front chamber is conveyed into the intermediate chamber with the outlet shutter closed and the inlet shutter open;

an exhaust step in which the intermediate chamber is closed by closing the inlet shutter and the exhaust device operates and discharge gas from the intermediate chamber; and a firing step in which the outlet shutter is opened, and the cathode material in the intermediate chamber is conveyed into the rear chamber and then fired through the temperature-maintaining section in the rear chamber, and wherein dry air or oxygen is supplied into the intermediate chamber through a gas supply nozzle of the intermediate chamber immediately after the exhaust step, wherein the inlet shutter and the outlet shutter are controlled not to be simultaneously opened, whereby gas in the front chamber is prevented from diffusing into the rear chamber.

8. The method of claim 7, wherein:
the exhaust device is any one of a vacuum pump, an aspirator, and a blower in the exhaust step.

* * * * *